(12) United States Patent
Vencelj et al.

(10) Patent No.: US 10,054,697 B1
(45) Date of Patent: Aug. 21, 2018

(54) DEVICE AND METHOD FOR LOCATING A RADIATION EMITTING SOURCE VIA ANGULAR DEPENDENCE USING A SINGLE DETECTION CRYSTAL

(71) Applicant: Consolidated Nuclear Security, LLC, Oak Ridge, TN (US)

(72) Inventors: Matjaz Vencelj, Ljubljana (SI); Ashley C. Stowe, Knoxville, TN (US); Toni Petrovic, Ljubljana (SI); Jonathan S. Morrell, Farragut, TN (US); Andrej Kosicek, Podsreda (SI)

(73) Assignees: Consolidated Nuclear Security, LLC, Oak Ridge, TN (US); Jozef Stefan Institute, Ljubljana (SI); AISense D.O.O., Podsreda (SI)

( * ) Notice: Subject to any disclaimer, the term of this patent is extended or adjusted under 35 U.S.C. 154(b) by 0 days.

(21) Appl. No.: 15/484,757

(22) Filed: Apr. 11, 2017

(51) Int. Cl.
  *G01T 1/20* (2006.01)
  *G01T 3/06* (2006.01)
  *G01T 1/202* (2006.01)
  *G01T 1/24* (2006.01)
  *G01T 1/16* (2006.01)
  *G01T 3/08* (2006.01)

(52) U.S. Cl.
  CPC .............. *G01T 3/06* (2013.01); *G01T 1/1606* (2013.01); *G01T 1/2018* (2013.01); *G01T 1/2023* (2013.01); *G01T 1/24* (2013.01); *G01T 3/08* (2013.01)

(58) Field of Classification Search
  CPC .......... G01T 1/167; G01T 7/00; G01T 1/243; G01T 1/2023; G01T 1/2018; G01T 3/00; G01T 3/06; G01T 3/08

USPC ......................................................... 250/362
See application file for complete search history.

(56) References Cited

U.S. PATENT DOCUMENTS

| | | | | |
|---|---|---|---|---|
| 4,531,058 A * | 7/1985 | Burnham | ............... | G01T 1/2985 250/363.03 |
| 6,369,390 B1 * | 4/2002 | Genna | .................... | G01T 1/2002 250/368 |
| 7,274,023 B2 * | 9/2007 | Clarke | .................... | G01T 1/167 250/363.01 |
| 7,411,197 B2 * | 8/2008 | He | ......................... | G01T 1/247 250/370.01 |
| 7,692,155 B2 * | 4/2010 | He | ......................... | G01T 1/247 250/370.01 |
| 8,815,627 B2 | 8/2014 | Monnet et al. | | |
| 9,164,181 B2 | 10/2015 | Menge | | |
| 2002/0024024 A1 * | 2/2002 | Mastrippolito | ....... | G01T 1/2985 250/515.1 |
| 2002/0074505 A1 * | 6/2002 | Francke | .................. | G01T 1/185 250/389 |

(Continued)

*Primary Examiner* — Taeho Jo
(74) *Attorney, Agent, or Firm* — Clements Bernard Walker PLLC; Christopher L. Bernard

(57) ABSTRACT

A device for sensing, locating, and characterizing a radiation emitting source, including: a detection crystal having dimensions great enough such that regional differences in radiation response are generated in the detection crystal by radiation impinging on one or more surfaces of the detection crystal; and a plurality of detectors one or more of coupled to and disposed on a plurality of surfaces of the detection crystal operable for detecting the regional differences in radiation response generated in the detection crystal by the radiation impinging on the one or more surfaces of the detection crystal.

20 Claims, 2 Drawing Sheets

(56) References Cited

U.S. PATENT DOCUMENTS

| | | | |
|---|---|---|---|
| 2004/0054248 A1* | 3/2004 | Kimchy | A61B 5/055 600/3 |
| 2004/0204646 A1* | 10/2004 | Nagler | A61B 1/05 600/424 |
| 2006/0192128 A1* | 8/2006 | Benlloch Bavciera | G01T 1/1642 250/369 |
| 2007/0080297 A1* | 4/2007 | Clarke | G01T 1/167 250/366 |
| 2007/0235657 A1* | 10/2007 | He | G01T 7/005 250/389 |
| 2009/0114829 A1* | 5/2009 | He | G01T 7/005 250/370.01 |
| 2010/0078571 A1* | 4/2010 | Myjak | G01T 1/1647 250/370.08 |
| 2011/0073763 A1* | 3/2011 | Subbarao | A61B 6/037 250/362 |
| 2011/0192981 A1* | 8/2011 | Menge | G01T 1/203 250/362 |
| 2013/0206995 A1* | 8/2013 | Sur | G01T 7/00 250/370.1 |
| 2013/0208850 A1* | 8/2013 | Schmitt | G01N 23/20 378/4 |
| 2014/0175290 A1* | 6/2014 | Field | G01N 9/24 250/361 R |
| 2014/0224994 A1* | 8/2014 | Speller | G01T 1/2907 250/362 |
| 2014/0246600 A1* | 9/2014 | Kotter | G01T 3/00 250/389 |
| 2015/0275080 A1* | 10/2015 | Ronda | C04B 35/01 250/362 |
| 2015/0285921 A1* | 10/2015 | Shah | G01R 33/481 600/411 |
| 2016/0018532 A1 | 1/2016 | Scott et al. | |
| 2016/0306052 A1* | 10/2016 | Ramsden | G01T 1/169 |

* cited by examiner

DEVICE AND METHOD FOR LOCATING A RADIATION EMITTING SOURCE VIA ANGULAR DEPENDENCE USING A SINGLE DETECTION CRYSTAL

STATEMENT REGARDING FEDERALLY SPONSORED RESEARCH OR DEVELOPMENT

The U.S. Government has rights to the present disclosure pursuant to Contract No. DE-NA0001942 between the U.S. Department of Energy and Consolidated Nuclear Security, LLC.

FIELD OF THE DISCLOSURE

The present disclosure relates generally to a device and method for locating a radiation emitting source. More specifically, the present disclosure relates to a device and method for locating a radiation emitting source via angular dependence using a single detection crystal.

BACKGROUND OF THE DISCLOSURE

It is critically important, but often difficult, to sense, locate, and describe a radiation emitting source. To accomplish these tasks, bulky, expensive devices that use multiple detection crystals arranged in a geometric pattern are typically used. Multiple detection crystals arranged in a geometric pattern, along with complex software, are needed to assess the directionality characteristics of the radiation emitting source. This is accomplished by analyzing differences in the detection signals from the various crystals and the associated detectors. Thus, what is still needed in the art is a device and method for sensing, locating, and describing a radiation emitting source that utilizes only a single detection crystal, such that size, complexity, and cost of the device and method can be minimized.

BRIEF SUMMARY OF THE DISCLOSURE

In various exemplary embodiments, the present disclosure provides a device and method for sensing, locating, and describing a radiation emitting source that utilizes only a single detection crystal, such that size, complexity, and cost of the device and method are minimized. Preferably, the detection crystal is a neutron or gamma detection crystal, such as a scintillating detection crystal, a semiconducting detection crystal, or a charge collecting detection crystal, where the detection crystal has a predetermined geometric shape. Appropriate detectors, such as photodetectors, are coupled adjacent to or disposed on selected surfaces of the detection crystal, thereby allowing the localized radiation responses of various regions of the detection crystal to be relatively quantified.

In one exemplary embodiment, the present disclosure provides a device for sensing, locating, and characterizing a radiation emitting source, comprising: a detection crystal having dimensions great enough (depending on the material) such that regional differences in radiation response are generated in the detection crystal by radiation impinging on one or more surfaces of the detection crystal; and a plurality of detectors one or more of coupled adjacent to and disposed on a plurality of surfaces of the detection crystal operable for detecting the regional differences in radiation response generated in the detection crystal by the radiation impinging on the one or more surfaces of the detection crystal. The detection crystal comprises one or more of a neutron detection crystal and a gamma detection crystal. The detection crystal comprises one or more of a scintillating detection crystal, a semiconducting detection crystal, and a charge collecting detection crystal. The detection crystal comprises one of LiInSe2, BP, BN, LiF, a Si-coated material, NaI, CsI2, BGO, and SrI2. The detection crystal comprises one of a plate-shaped crystal, a prismatic crystal, a cubic crystal, a rectangular crystal, a tetrahedral crystal, a tetragonal crystal, and a spherical crystal. The detection crystal comprises at least one dimension with a thickness equal to or greater than the radiation absorption depth of the constituent material. Optionally, the plurality of detectors comprise a plurality of photodetectors. Optionally, the plurality of detectors comprise a plurality of PMTs, SiPMs, or APDs. The device further optionally comprises a substrate coupled to the detection crystal and the plurality of detectors. The device further optionally comprises a radiation transparent housing disposed about the detection crystal and the plurality of detectors. The device further comprises a common processor coupled to the plurality of detectors.

In another exemplary embodiment, the present disclosure provides a method for sensing, locating, and characterizing a radiation emitting source, comprising: providing a detection crystal having dimensions great enough (depending on the material) such that regional differences in radiation response are generated in the detection crystal by radiation impinging on one or more surfaces of the detection crystal; providing a plurality of detectors one or more of coupled adjacent to and disposed on a plurality of surfaces of the detection crystal operable for detecting the regional differences in radiation response generated in the detection crystal by the radiation impinging on the one or more surfaces of the detection crystal; exposing the detection crystal and the plurality of detectors to radiation from the radiation emitting source; and obtaining a relative response signal from each of the plurality of detectors. The detection crystal comprises one or more of a neutron detection crystal and a gamma detection crystal. The detection crystal comprises one or more of a scintillating detection crystal, a semiconducting detection crystal, and a charge collecting detection crystal. The detection crystal comprises one of LiInSe2, BP, BN, LiF, a Si-coated material, NaI, CsI2, BGO, and SrI2. The detection crystal comprises one of a plate-shaped crystal, a prismatic crystal, a cubic crystal, a rectangular crystal, a tetrahedral crystal, a tetragonal crystal, and a spherical crystal. The detection crystal comprises at least one dimension with a thickness equal to or greater than the radiation absorption depth of the constituent material. Optionally, the plurality of detectors comprise a plurality of photodetectors. Optionally, the plurality of detectors comprise a plurality of PMTs, SiPMs, or APDs. The method further optionally comprises, after obtaining the relative response signal from each of the plurality of detectors, realigning the detection crystal relative to the radiation emitting source and again obtaining a relative response signal from each of the plurality of detectors.

BRIEF DESCRIPTION OF THE DRAWINGS

The present disclosure is illustrated and described herein with reference to the various drawings, in which like reference numbers are used to denote like device components/method steps, as appropriate, and in which.

DETAILED DESCRIPTION OF THE DISCLOSURE

Figure 1:
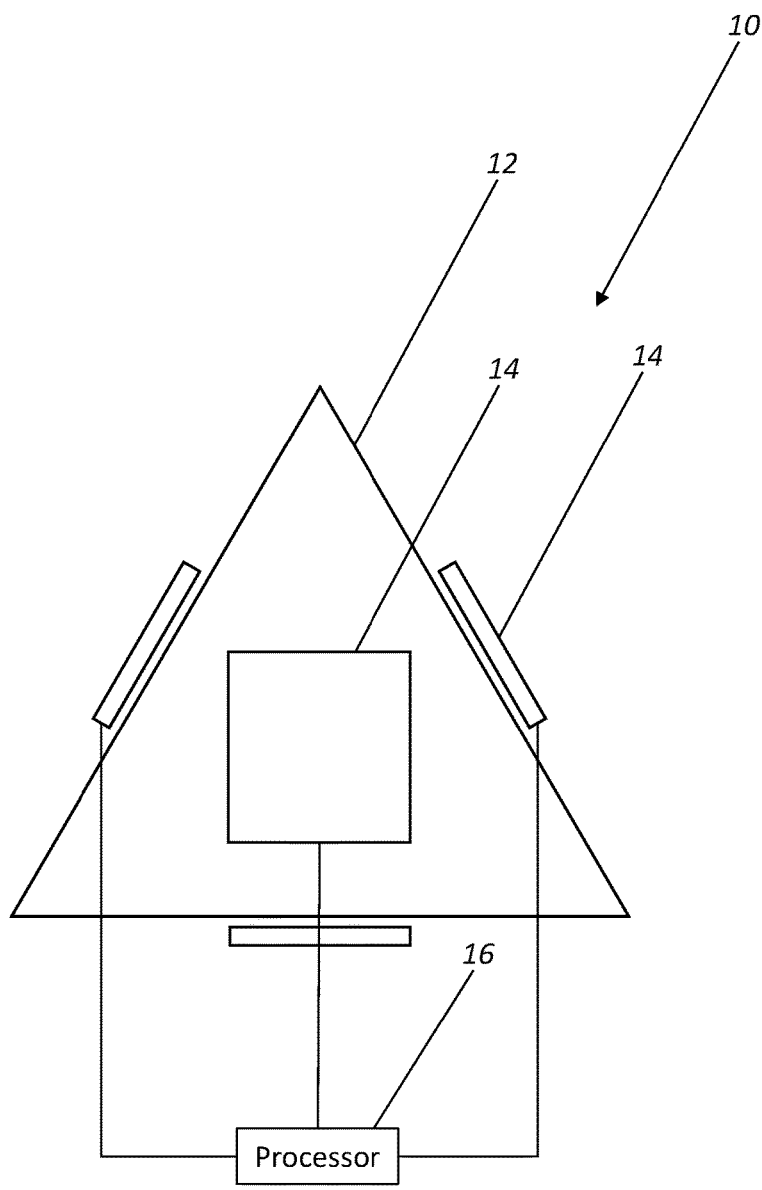
FIG. 1 is a schematic diagram illustrating one exemplary embodiment of the device for locating a radiation emitting source of the present disclosure.

Referring now specifically to FIG. 1, in one exemplary embodiment, the present disclosure provides a device 10 for sensing, locating, and describing a radiation emitting source (not illustrated) that utilizes only a single detection crystal 12, such that size, complexity, and cost of the device 10 are minimized.

Preferably, the detection crystal 12 is a neutron or gamma detection crystal, such as a scintillating detection crystal, a semiconducting detection crystal, or a charge collecting detection crystal, where the detection crystal has a predetermined geometric shape. The geometry of the crystal 12 can be plate-shaped, prismatic, cubic, rectangular, tetrahedral (illustrated), tetragonal, spherical, etc. A tetrahedral geometry is the simplest geometry that can be used to triangulate a signal. It will be readily apparent to those of ordinary skill in the art that any geometry providing a bulk crystal with opposed faces and/or spatially separated regions can be used. Preferably, the crystal 12 has a primary a thickness or diameter equal to or greater than the radiation absorption depth of the constituent material in a direction of interest in order to provide the desired spatial separation and response variation. The neutron detection crystal can be, for example, acrylic, LiInSe2, BP, BN, LiF, CdS, ZnSe, CdWO4, Gd2SiO5, CLYC, a Si-coated material, or the like. The gamma detection crystal can be, for example, NaI, CsI2, BGO, SrI2, CZT, HPGe, LaBr, LYSO, CdWO4, BaF2, an activated acrylate, or the like. Fast decay times are preferred to prevent signal pileup.

Appropriate detectors 14, such as photodetectors, are coupled adjacent to or disposed on selected surfaces of the detection crystal 12, thereby allowing the localized radiation responses of various regions of the detection crystal 12 to be relatively quantified. Thus, it is important that multiple (two or more), spatially separated detectors 14 are collectively associated with multiple (two or more), spatially separated faces of the single detection crystal 12. For example, the use of a tetrahedral crystal 12 with four detectors 14 roughly at the center of each crystal face provides full 4pi angular resolution. Appropriate photodetectors include, for example, PMTs, SiPMs, APDs, etc.

The detection crystal 12 and detectors 14 can be disposed on an appropriate substrate (not illustrated) and/or in an appropriate housing (not illustrated) for ease of use. Preferably, the housing is at least partially transparent to radiation, such that it may impinge upon the crystal 12. The detectors 14 are electrically coupled to an appropriate processor 16 for signal collection and processing via, for example, a counting algorithm and/or an amplitude algorithm. A correlation between signal response (primarily amplitude) within a defined time gate is used to compare radiation responses and determine directionality. If the detectors 14 are separated by more than the radiation absorption depth, then the induced signal is preferentially stronger on the closer detector 14. Of course, an appropriate display (not illustrated) may be electrically coupled to the processor 16 for user readout of the sensing, location, and description information related to the radiation emitting source. It should be noted that multiple crystal/detector devices 10, as illustrated and described herein, can be disposed on a single substrate and/or within a single housing and coupled to the processor 16 to further enhance the data collected.

Figure 2:
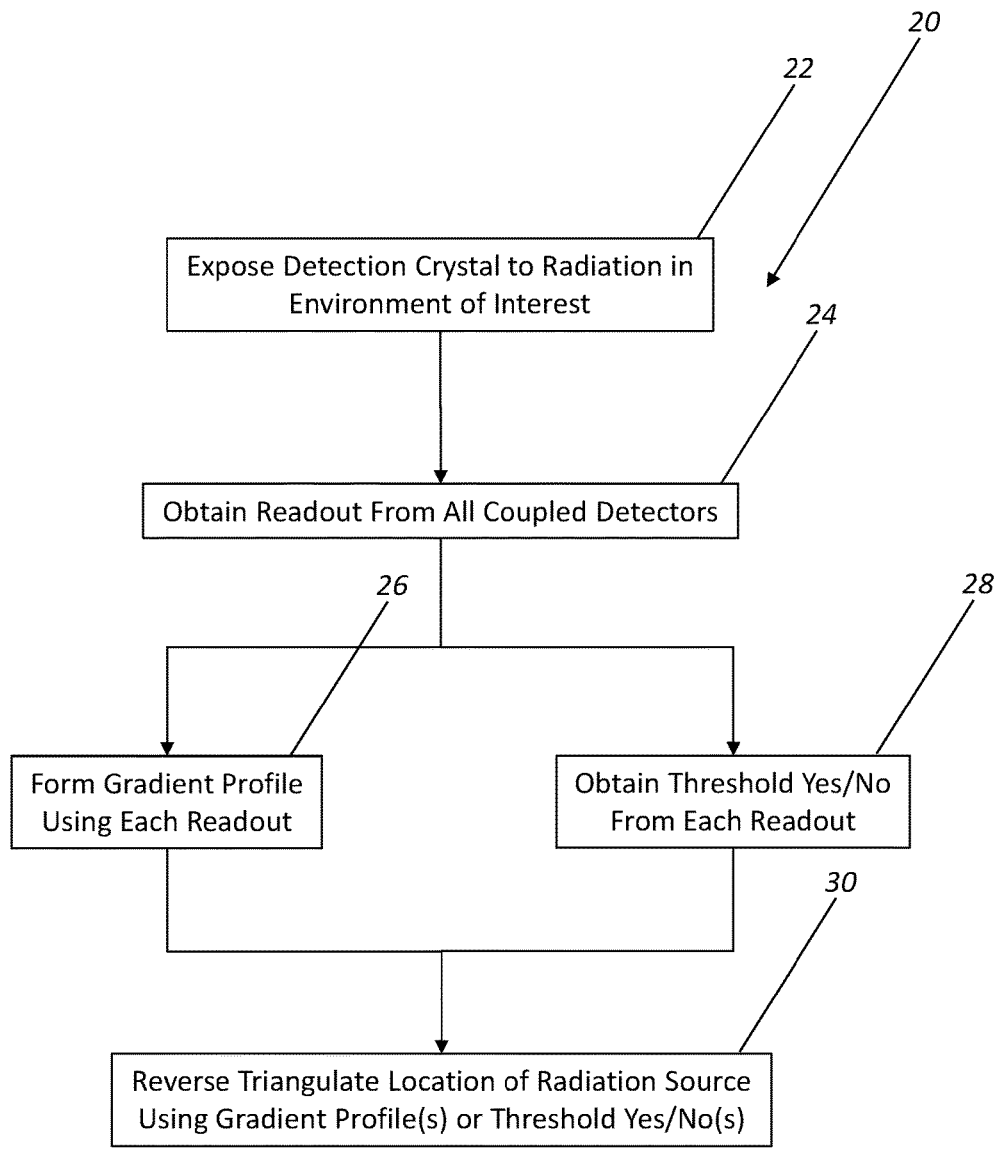
FIG. 2 is a flowchart illustrating one exemplary embodiment of the method for locating a radiation emitting source of the present disclosure.

Referring now specifically to FIG. 2, in one exemplary embodiment, the present disclosure provides a method 20 for sensing, locating, and describing a radiation emitting source (not illustrated) that utilizes only a single detection crystal 12 (FIG. 1), such that size, complexity, and cost of the device 10 (FIG. 1) are minimized.

The method 20 begins by exposing the device 10 to radiation in an environment of interest (Block 22) and obtaining a readout from all of the detectors 14 (FIG. 1) coupled to the crystal 12 (Block 24). Using lower energy thresholds, a radiation gradient profile can be generated using each readout (Block 26). Measured amplitudes of pulses in each coincident pulse group can be used along with known properties of the transport of light or charge in the sensing medium to deduce the loci of detection events in the material. Alternatively, using higher energy thresholds, a radiation threshold yes/no can be obtained from each readout (Block 28). Here, only the readout on crystal sides proximal to the event absorption site (typically on the radiation impinging side) would exceed pre-set thresholds. "Hot side" crystal faces would thus demonstrate higher recorded count rates and allow for spatial reconstruction. In this manner, the detector 14 associated with each region of the crystal 12 is sampled and provides information related to the radiation response of that region of the crystal 12, via scintillation or otherwise, thereby providing information related to the relative amount of radiation impinging on that region of the crystal 12. Response intensity will be relatively greatest from the detector 14 associated with the surface upon (and/or directly opposed to) which radiation is most directly impinging, as opposed to other tangential surfaces. In this manner, the location of (and details about the intensity of) the radiation emitting source can be reverse triangulated (Block 30). As a reverse triangulation embodiment example, the first approximation for the impinging direction is the outer vector normal on the surface with the greatest response intensity, corrected in a second step by a vector sum of the remaining outer orthogonal vectors (other than next to the member), weighted by respective response intensities of the surfaces.

Optionally, the orientation of the device 10 can be varied and new readings taken in order to refine the sensing, location, and description of the radiation emitting source.

A special case occurs when the crystal 12 is thicker than the full absorption depth of thermal neutrons. Neutrons will be preferentially absorbed on the impinging surface. In this case, the neutron depth profile as calculated by forming the ratio of signals from two sides will be non-uniform. However the gamma response over the same volume will be uniform throughout the bulk—and therefore on both sensors. The gamma signal is not used for location in this specific case, but must be accounted for in signal processing because the signal is not simply a neutron signal. If the crystal 12 is large enough that it differentially absorbs gamma rays and neutrons, then both gamma and neutron signals can be used to improve location detection using two triangulation calculations or as a means to differentiate gamma and neutron signals from different sources simultaneously. A significant proportion of "bulk" events, i.e., where a coincident pair of signals from both sides are of similar magnitudes, indicates a gamma field (and possibly allows for a quantification of the latter). Total gamma count can then be used as a numerical counter for false neutron hits in cases with intense gamma background.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following non-limiting claims.

What is claimed is:

1. A device for sensing, locating, and characterizing a radiation emitting source, comprising:
    a detection crystal having dimensions great enough such that regional differences in radiation response are generated in the detection crystal by radiation impinging on one or more opposed surfaces of the detection crystal, wherein the detection crystal is a single detection crystal; and
    a plurality of detectors one or more of coupled adjacent to and disposed on a plurality of opposed surfaces of the detection crystal operable for detecting the regional differences in radiation response generated in the detection crystal by the radiation impinging on the one or more opposed surfaces of the detection crystal.

2. The device of claim 1, wherein the detection crystal comprises one or more of a neutron detection crystal and a gamma detection crystal.

3. The device of claim 1, wherein the detection crystal comprises one or more of a scintillating detection crystal, a semiconducting detection crystal, and a charge collecting detection crystal.

4. The device of claim 1, wherein the detection crystal comprises one of LiInSe2, BP, BN, LiF, a Si-coated material, NaI, CsI2, BGO, and SrI2.

5. The device of claim 1, wherein the detection crystal comprises one of a plate-shaped crystal, a prismatic crystal, a cubic crystal, a rectangular crystal, a tetrahedral crystal, a tetragonal crystal, and a spherical crystal.

6. The device of claim 1, wherein the detection crystal comprises at least one dimension with a thickness equal to or greater than the radiation absorption depth of its constituent material.

7. The device of claim 1, wherein the plurality of detectors comprise a plurality of photodetectors.

8. The device of claim 1, wherein the plurality of detectors comprise a plurality of PMTs, SiPMs, or APDs.

9. The device of claim 1, further comprising a substrate coupled to the detection crystal and the plurality of detectors.

10. The device of claim 1, further comprising a radiation transparent housing disposed about the detection crystal and the plurality of detectors.

11. The device of claim 1, further comprising a common processor coupled to the plurality of detectors.

12. A method for sensing, locating, and characterizing a radiation emitting source, comprising:
    providing a detection crystal having dimensions great enough such that regional differences in radiation response are generated in the detection crystal by radiation impinging on one or more opposed surfaces of the detection crystal, wherein the detection crystal is a single detection crystal;
    providing a plurality of detectors one or more of coupled adjacent to and disposed on a plurality of opposed surfaces of the detection crystal operable for detecting the regional differences in radiation response generated in the detection crystal by the radiation impinging on the one or more opposed surfaces of the detection crystal;
    exposing the detection crystal and the plurality of detectors to radiation from the radiation emitting source; and
    obtaining a relative response signal from each of the plurality of detectors.

13. The method of claim 12, wherein the detection crystal comprises one or more of a neutron detection crystal and a gamma detection crystal.

14. The method of claim 12, wherein the detection crystal comprises one or more of a scintillating detection crystal, a semiconducting detection crystal, and a charge collecting detection crystal.

15. The method of claim 12, wherein the detection crystal comprises one of LiInSe2, BP, BN, LiF, a Si-coated material, NaI, CsI2, BGO, and SrI2.

16. The method of claim 12, wherein the detection crystal comprises one of a plate-shaped crystal, a prismatic crystal, a cubic crystal, a rectangular crystal, a tetrahedral crystal, a tetragonal crystal, and a spherical crystal.

17. The method of claim 12, wherein the detection crystal comprises at least one dimension with a thickness equal to or greater than the radiation absorption depth of its constituent material.

18. The method of claim 12, wherein the plurality of detectors comprise a plurality of photodetectors.

19. The method of claim 12, wherein the plurality of detectors comprise a plurality of PMTs, SiPMs, or APDs.

20. The method of claim 12, further comprising, after obtaining the relative response signal from each of the plurality of detectors, realigning the detection crystal relative to the radiation emitting source and again obtaining a relative response signal from each of the plurality of detectors.

* * * * *